United States Patent [19]

Riggs

[11] Patent Number: 4,499,751
[45] Date of Patent: Feb. 19, 1985

[54] DYNAMIC PRESSURE GENERATOR

[75] Inventor: Michael T. Riggs, Batavia, N.Y.

[73] Assignee: PCB Piezotronics, Inc., Depew, N.Y.

[21] Appl. No.: 481,148

[22] Filed: Apr. 1, 1983

[51] Int. Cl.³ .............................................. G01L 27/00
[52] U.S. Cl. ..................................................... 73/4 R
[58] Field of Search .................................. 73/4 R, 37

[56] References Cited

U.S. PATENT DOCUMENTS

| | | | |
|---|---|---|---|
| 2,539,418 | 1/1951 | Grogan | 73/4 R |
| 3,033,027 | 5/1962 | Perls et al. | 73/4 R X |
| 3,208,264 | 9/1965 | Melton | 73/4 R |
| 3,264,861 | 8/1966 | Miles | 73/4 R |
| 3,590,626 | 7/1971 | Hugli | 73/4 R |
| 3,777,546 | 12/1973 | Rollins | 73/4 R |
| 3,782,168 | 1/1974 | Wailes | 73/4 R |

Primary Examiner—S. Clement Swisher
Assistant Examiner—Joseph W. Roskos
Attorney, Agent, or Firm—Sommer & Sommer

[57] ABSTRACT

A pressure generator for testing and calibrating pressure transducers has a body with an internal chamber. The chamber is filled with a liquid, statically pressurized. A piston is mounted in the chamber on a suspension member. A coil, mounted to move with the piston, is arranged in a magnetic field. The coil is supplied with varying current to cause the piston to oscillate or dither in the chamber. Such oscillation creates a dynamic pressure which is superimposed on the static pressure. Openings are provided in the body to receive the sensing end of one or more pressure transducers.

5 Claims, 3 Drawing Figures

DYNAMIC PRESSURE GENERATOR

BACKGROUND OF THE INVENTION

1. Field of the Invention

The present invention relates generally to the field of pressure generators, and more particularly to an improved pressure generator which may superimpose a dynamic pressure on a static pressure.

2. Description of the Prior Art

Examples of earlier forms of pressure generators are shown in one or more of the following U.S. Pat. Nos. 3,590,626, 3,782,168, 3,868,844, 4,051,712 and 4,272,162.

Of these, U.S. Pat. No. 3,590,626 discloses a "Sinusoidal Pressure Calibrator" for use in calibrating piezoelectric pressure transducers. However, the entire apparatus, including the transducers-to-be-tested, was placed on a shaker table. Hence, since the transducers were shaken, there was an opportunity for introduction of spurious signals.

SUMMARY OF THE INVENTION

The present invention provides an improved pressure generator which broadly comprises: a body having an internal chamber; a fluid filling this chamber; pressurizing means for statically pressurizing th fluid in the chamber; a piston mounted on the body in the chamber for movement relative to the body; a suspension member flexibly holding the piston to the body; and electomagnetic means operatively arranged to cause the piston to move relative to the body; whereby, when the piston moves, a dynamic pressure may be superimposed on such statically-pressurized fluid.

Accordingly, a general object of this invention is to provide an improved pressure generator, particularly suited for use in testing and calibrating piezoelectric pressure transducers.

Another object is to provide an improved pressure generator in which a dynamic pressure may be superimposed on a statically-pressurized fluid.

Another object is to provide an improved pressure generator for use in testing and calibrating pressure transducers, in which the transducer is not violently shaken.

These and other objects and advantages will become apparent from the foregoing and ongoing specification, the drawings and the appended claims.

DESCRIPTION OF THE PREFERRED EMBODIMENTS

Figure 1:
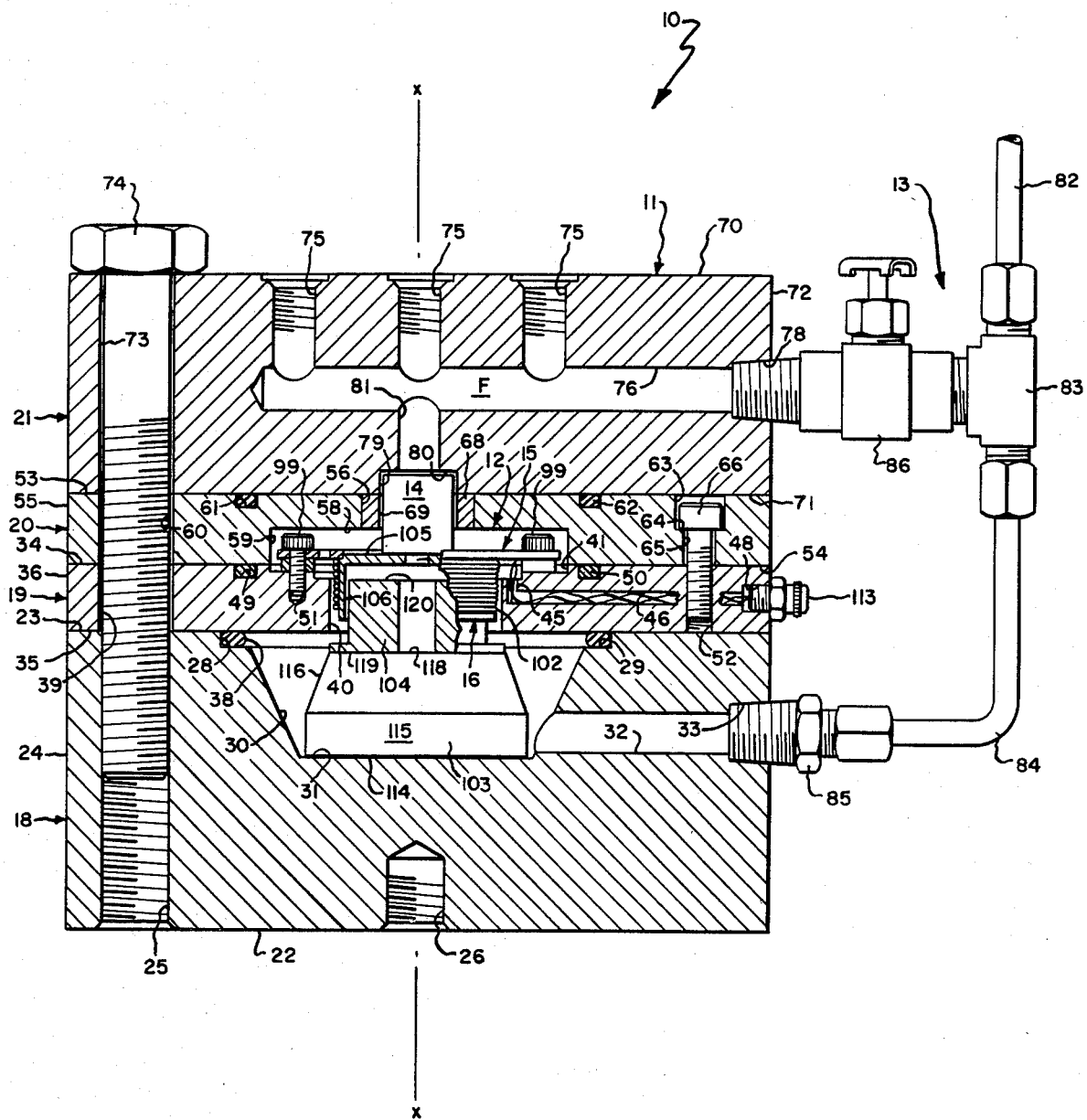
FIG. 1 is a fragmentary vertical sectional view of the improved pressure generator.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the drawings, and more particularly to FIG. 1 thereof, this invention provides an improved pressure generator, of which the presently preferred embodiment is generally indicated at 10. The improved pressure generator is shown as broadly including a body 11 having a chamber 12 therewithin; a fluid F entirely filling this chamber; pressurizing means, generally indicated at 13, for statically pressurizing the fluid in chamber 12; a piston 14 mounted in the chamber for movement relative to the body; a suspension member 15 flexibly holding the piston to the body; and electromagnetic means, generally indicated at 16, operatively arranged to cause the piston to move relative to the body; whereby, when the piston moves, a dynamic pressure may be superimposed on the statically-pressurized fluid in the chamber. The invention is deemed to have particular utility in the testing and calibration of piezoelectric pressure transducers, although this application is illustrative only. The ensuing description will first describe the structure of the preferred embodiment, and then discuss its operation.

STRUCTURE

Body 11

Body 11 is a four-part subassembly which includes a base 18; a magnetic flux plate 19, a bushing plate 20, and a cover 21.

Base 18 has a planar horizontal circular lower surface 22, a planar horizontal annular upper surface 23, and a cylindrical side wall 24 generated about a vertical axis x—x. This axis is also the axis of the assembled body. Hence, the various surfaces of revolution hereinafter described may be regarded as being generated about axis x—x, unless otherwise indicated. Base 18 is provided with eight tapped vertical through-holes, one of which is indicated at 25, arranged in a bolt circle. A tapped blind hole 26 extends axially upwardly into the base from its lower surface 22 to accommodate a threaded mounting stud (not shown) by which the body may be attached or connected to a suitable support (not shown). Another recess extends downwardly into the base from its upper surface. Specifically, this recess is bounded by a cylindrical surface 28 extending downwardly from upper surface 23, an upwardly-facing annular horizontal surface 29, a downwardly- and inwardly-inclined frusto-conial surface 30, and an upwardly-facing horizontal circular bottom surface 31. A radial hole 32 extends horizontally into the base from its outer side wall 24 to intersect frusto-conial surface 30 and to communicate with the recess. A marginal portion of the base surrounding hole 32 proximate its juncture with side wall 24, is tapped, as indicated at 33, to receive a suitable fitting.

The flux plate 19 is a disc-like member having annular planar horizontal upper and lower surfaces 34,35, and a cylindrical side wall 36 of a diameter substantially equal to the diameter of the base side wall. The flux plate lower surface 35 is adapted to rest on the base upper surface 23, compressing an interposed sealing O-ring 38 against base surface 29. The flux plate has eight vertical through-holes, one of which is indicated at 39, arranged in a bolt circle and aligned with the base holes 25. The flux plate has an axial vertical through-hole bounded by cylindrical surface 40, the upper mouth of which is surrounded by a stepped recess. Specifically, this stepped recess is defined by a cylindrical surface 41 extending downwardly from upper surface 34, an upwardly-facing annular horizontal surface 42, a cylindrical surface 43 extending downwardly therefrom, and an upwardly-facing annular horizontal surface 44 continuing radially inwardly to join through-hole wall surface 40. A somewhat L-shaped passageway communicates this recess with the outermost side wall. This passageway includes a hole 45 extending downwardly from recess surface 42, and intersected by a horizontal hole 46 extending radially outwardly to open onto the side wall. A marginal portion of the flux plate surrounding hole 46 proximate its juncture with side wall 36, is tapped, as indicated at 48, to accommodate a threaded fitting. An annular grove 49 extends downwardly into the flux plate from its upper surface 34 to accommodate the presence of a sealing O-Ring 50. Four tapped blind holes, one of which is indicated at 51, arranged in a bolt circle, extend downwardly into the flux plate from recess surface 42. Four other tapped vertical through-holes, one of which is indicated at 52, are arranged in a bolt circle an are positioned interstitially among the plurality of holes 39.

The bushing plate 20 is also a disc-like member having annular planar horizontal upper and lower surfaces 53,54, and an outermost cylindrical side wall 55. The bushing plate is provided with a stepped axial through-opening bounded by a cylindrical wall 56 extending downwardly from upper surface 53, a downwardly-facing annular horizontal surface 58, and a cylindrical wall 50 continuing downwardly therefrom to join lower surface 54. The bushing plate is also provided with eight vertical through-holes, one of which is indicated at 60, arranged in a bolt circle and adapted to register with holes 25 and 39, and is further provided with an annular recess 61 extending downwardly from its upper surface 53 to accommodate the presence of a sealing O-ring 62. The bushing plate is further provided with two diametrically-opposite stepped through-holes, one of which is shown as being bounded by a cylindrical surface 63 extending downwardly from upper surface 53, an upwardly-facing annular horizontal surface 64, and a cylindrical surface 64 continuing downwardly therefrom to join lower surface 54. These two stepped holes are intended to accommodate bolt fasteners, one of which is indicated at 66, the threaded shank portions of which matingly engage flux plate holes 52, by which the magnetic and bushing plates may be connected together.

The bushing plate also carries a cylindrical bushing 68 having its upper and lower annular end surfaces coplanar with upper and lower surfaces 53,54, respectively, having its outwardly-facing cylindrical surface engaging plate surface 56, and having its inwardly-facing cylindrical surface 69 spaced from the piston 14. This bushing may be formed of a beryllium-copper alloy.

The cover 21 is a vertically-thickened disc-like member having planar horizontal upper and lower surfaces 70,71, and an outermost cylindrical side wall 72. The cover is provided with eight vertical through-holes, one of which is indicated at 73, arranged in a bolt circle and adapted to register with aligned holes 60, 39 and 25. A corresponding plurality of bolt-like fasteners, one of which is indicated at 74, have their head portions engaging cover upper surface 70, have their shank portions passed through holes 60 and 39, and have their threaded marginal end portions matingly engaging base holes 25. Thus, these bolts may be selectively tightened to draw the base-magnetic plate-bushing plate-cover subassembly together.

Cover 21 is provided with a somewhat trident-shaped array of communicating interior passages. Three tapped holes, severally indicated at 75, extend downwardly into the cover from its upper surface 70, and are intersected by a horizontal hole 76 which extends inwardly from the cover side wall 72. A marginal portion of the cover surrounding hole 76 proximate its juncture with side wall 72, is tapped, as indicated at 78, to receive a fitting. A stepped axial hole extends upwardly from the cover's lower surface to intersect horizontal hole 76. This stepped hole is shown as being bounded by a cylindrical surface 79 extending upwardly from lower surface 71, a downwardly-facing annular horizontal surface 80, and a cylindrical surface 81 continuing upwardly therefrom to intersect hole 76.

Chamber 12

When the various component parts are assembled together, the body thus formed has a chamber 12 therewithin. Specifically, this chamber is bounded by surfaces 31, 30, 29, 28, 35, 40, 44, 43, 42, 59, 58, 69, 79 and 80. This chamber communicates with holes 75, 75, 75 via holes 76 and 81. Hole 32 also communicates with the chamber.

Pressurizing Means 13

The pressurizing means 13 includes a source of static pressure (not shown); a conduit 82 communicating the pressure source with a Tee 83; a conduit 84 leading from the Tee and having a fitting 85 at its distal end. which fitting is matingly received in tapped body opening 33; and a valved fitting 86 having one end communicating with the Tee and having its other end matingly received in tapped body opening 78. The serviced fluid is preferably an incompressible liquid, and the static pressure source may simply be a suitable weight acting on a surface of same. Other pressure sources may be readily substituted therefor.

Piston 14

Figure 2:
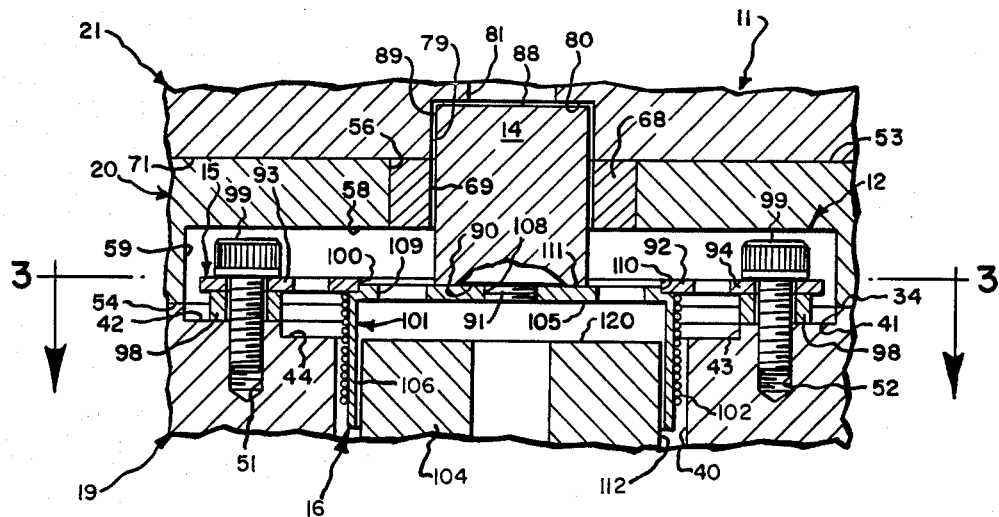
FIG. 2 is a fragmentary enlarged detail view of the suspension member, the coil form, and the piston.

As best shown in FIG. 2, piston 14 is a solid cylindrical member having a horizontal circular upper face 88, a cylindrical side wall surface 89, and a horizontal lower face 90 from which a threaded mounting stud 91 depends. This piston may also be formed of a beryllium-copper alloy.

Piston 14 is arranged such that an annular portion of its upper face 88 is arranged to face cover surface 80. such that its side wall is arranged to face cover surface 79, and bushing surface 69. The piston side wall is not intended to sealingly engage the bushing.

Suspension Member 15

Figure 3:
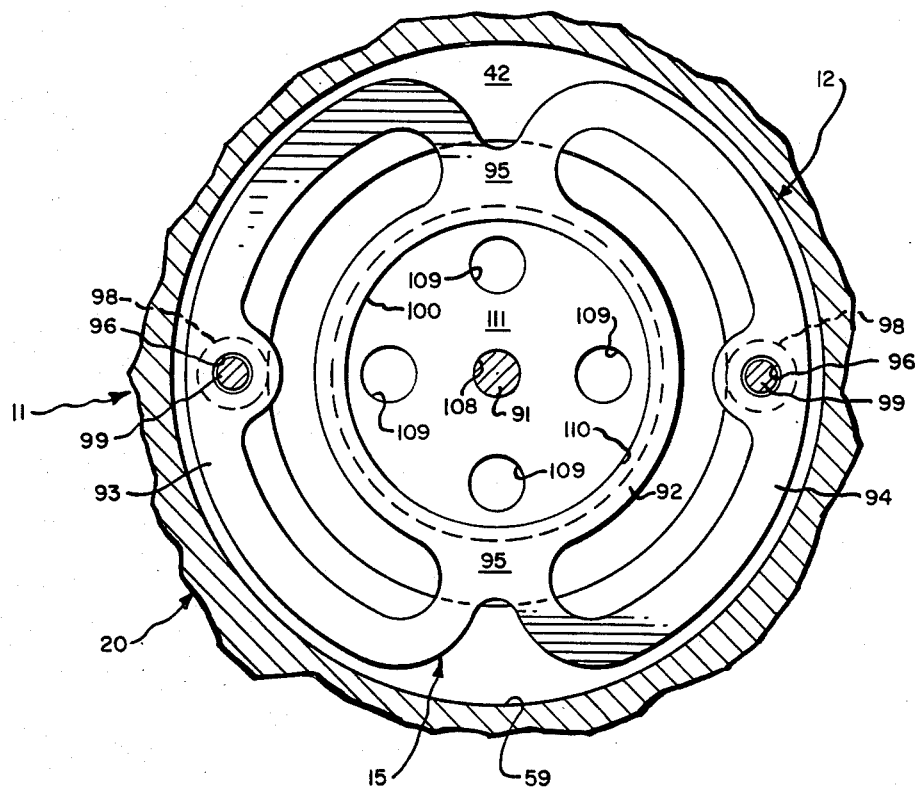
FIG. 3 is a fragmentary horizontal sectional view thereof, taken generally on line 3—3 of FIG. 2, and showing the suspension member in top plan.

As best shown in FIGS. 2 and 3, the suspension member 15 is an integrally-formed specially-configured element of uniform vertical thickness (FIG. 2). However, when viewed in top plan (FIG. 3), the suspension member is seen as having central ring-like portion 92 bounded by laterally-spaced inwardly-facing C-shaped left and right mounting portions 93,94. The central and mounting portions are connected by integral webs 95,95 proximate the six o'clock and twelve o'clock positions, as seen in FIG. 3. Each mounting portion has an inwardly-extending pip proximate its midpoint, and each pip is provided with a hole 96. As best shown in FIG. 2, washer-like stand-off elements 98,98 are positioned between the suspension member mounting portions and bushing plate surface 42. Fasteners 99 have their heads engaging the mounting portions, and have their threaded shank portions passed through holes 96 and stand off elements 98 matingly received in bushing plate holes 51. Thus, fasteners 99 may be selectively tightened to hold the resilient member to the flux plate.

Adverting now to FIG. 3, persons skilled in this art will appreciate that the resilient member central portion is somewhat flexible, this being permitted by compliant flexure of the connecting webs 95,95. To facilitate this, the resilient member is preferably formed of a phenolic material, or equivalent. The inwardly-facing cylindrical surface of the central ring-like portion is indicated at 100.

Electromagnetic Means 16

In addition to portions of the structure heretofore described, the electromagnetic means 16 includes a coil-form 101 depending from the suspension member, a coil 102 wound about the coil-form, and a magnet 103 and polepiece 104 mounted on the base and extending upwardly within the coil-form.

As best shown in FIG. 2, the coil-form is an inverted cup-shaped member having a substantially circular base 105, and having a thin-walled cylindrical skirt 106 depending from the outer margin of base 105. The base has a tapped axial through-hole 108 in which piston mounting stud 91 is received; four vertical through-holes, severally indicated at 109, arranged in a bolt circle, and an annular corner notch 110 proximate the junction of its uppermost and outermost surfaces. This notch is adapted to receive the lower and inward annular corner of the suspension member ring-like portion, with the upper surface 111 of the coil-form being drawn tightly against the piston lower face 90.

The coil-form's cylindrical skirt 106 extends downwardly from the base 105, and is arranged in spaced facing relation to polepiece cylindrical surface 112, and to magnetic plate surface 40.

The coil 102 includes numerous turns of wire wound around the outer surface of coil-form skirt 106. The coil is also in spaced relation to polepiece surface 112. Insulated conductors from the coil pass through passageways 45,46 and through electrical connector 113. Thus, a suitable electrical signal from an external source (not shown) may be applied to connector 113 to energize the coil and create a desired magnetic field.

Adverting now to FIG. 1, magnet 103 is shown as having a circular base 114 engaging base surface 31, a side wall including cylindrical surface 115 and frustoconial surface 116, and a planar horizontal circular upper surface 118. The polepiece 104 is a vertically-thickened ring-like member having its annular lower surface 119 engaging magnet upper surface 118. The polepiece upper face 120 and cylindrical side wall 112 are in faced spacing relation to the proximate portions of the coil-form.

For illustrative purposes only, base 18, flux plate 19, bushing plate 20, cover 21, and polepiece 104 may each be formed of ingot iron; the coil-form 101 may be formed of a 2024-T4 aluminum alloy; the bushing 68 and piston 14 may be formed of a beryllium-copper alloy; and permanent magnet 103 may be formed of Alnico.

OPERATION

The structure is assembled as illustrated in the drawings and as hereto described.

Persons skilled in this art will appreciate that the structure thus formed creates a magnetic circuit which includes the upper pole of the magnet, polepiece 104 an annular air gap between the polepiece and flux plate surface 40, and connected body members 19 and 18 magnetically contacting the magnet's other pole. The coil 102 is arranged in the air gap. The coil may be supplied with a varying current, such as a sinusoidal current, from the external source. The effect of this is to cause the coil form-piston subassembly to oscillate or dither within the chamber in response to the wave form of the applied current.

The chamber is comletely filled with fluid, preferably a liquid, and such fluid is statically pressurized to the extent desired. Piston 14 is not mounted in a conventional cylinder. Rather its frequency of oscillation creates a dynamic pressure, which is superimposed on the static pressure.

Cover tapped holes 75,75,75 are adapted to receive the pressure-sensitive ends of pressure transducers (not shown), such as those of a piezoelectric type. However, this number of holes 75 is somewhat arbitrary, and may be readily varied. For example, if two of holes 75 were provided, a transducer-to-be-tested would be mounted in one hole, with a standard transducer mounted in the other. The third hole would be covered. The apparatus could be operated to apply static and dynamic pressures to both transducers, and their outputs compared. However, this possible application is illustrative only.

Many modifications may be made without departing from the spirit of the invention. Materials, dimensions and shapes may be readily changed or modified, consistent with the purpose of each component. The suspension member may take many forms, and is not limited to the precise form of the preferred embodiment. The serviced fluid can be either a liquid or a gas, although use of a liquid is presently preferred. The manifolding holes 75 in which the transducers are mounted, may be provided at various places.

Therefore, while the preferred embodiment has been shown and described, and several modifications thereof discussed, persons skilled in this art will appreciate that various additional changes and variations may be made without departing from the spirit of the invention, as defined and differentiated by the following claims.

What is claimed is:

1. A dynamic pressure generator, comprising:
    a body having a chamber therewithin;
    a fluid filling said chamber;
    pressurizing means for statically pressurizing the fluid in said chamber;
    a piston mounted in said chamber for movement relative to said body;
    a suspension member flexibly holding said piston to said body, said suspension member having a plurality of openings therethrough to allow the pressure of said fluid to equalize on opposite sides of said suspension member; and
    electromagnetic means acting between said body and piston and exposed to said fluid and operatively arranged to cause said piston to move relative to said body;
    whereby, when said piston moves, a dynamic pressure may be superimposed on such statically-pressurized fluid.

2. A dynamic pressure generator as set forth in claim 1 wherein said suspension member is a resilient member.

3. A dynamic pressure generator as set forth in claim 2 wherein said resilient member is a spring.

4. A dynamic pressure generator as set forth in claim 3 wherein said resilient member is a flat spring.

5. A dynamic pressure generator as set forth in claim 1 wherein said electromagnetic means includes an air gap, a magnetic field extending across said air gap, and a coil arranged in said air gap.

* * * * *